(12) United States Patent
Filsfils et al.

(10) Patent No.: US 7,898,973 B2
(45) Date of Patent: Mar. 1, 2011

(54) CONVERGENCE MEASUREMENT IN COMPUTER NETWORK

(75) Inventors: Clarence Filsfils, Brussels (BE); Kris Michielsen, Keerbergen (BE); Peter De Vriendt, Denderleeuw (BE); Emmanuel Tychon, Fexhe-le-Haut-Clocher (BE)

(73) Assignee: Cisco Technology, Inc., San Jose, CA (US)

( * ) Notice: Subject to any disclaimer, the term of this patent is extended or adjusted under 35 U.S.C. 154(b) by 944 days.

(21) Appl. No.: 11/807,725

(22) Filed: May 30, 2007

(65) Prior Publication Data

US 2008/0298265 A1 Dec. 4, 2008

(51) Int. Cl.
*H04L 12/28* (2006.01)
(52) U.S. Cl. .................................. 370/252; 370/236.2
(58) Field of Classification Search .................. 370/389, 370/236.1, 236.2, 236, 241.1, 252
See application file for complete search history.

(56) References Cited

U.S. PATENT DOCUMENTS 7,466,661 B1 * 12/2008 Previdi et al. ............... 370/254
7,599,310 B2 * 10/2009 Nam et al. ................... 370/252

OTHER PUBLICATIONS

Francois et al., "Achieving sub-second IGP convergence in large IP networks", ACM SIGCOMM Comput. Commun. Rev., vol. 35, No. 3, pp. 35-44, Jul. 2005.
Koodli et al., "One-way Loss Pattern Sample Metrics", IETF RFC 3357, Aug. 2002.

* cited by examiner

*Primary Examiner*—Brenda Pham
(74) *Attorney, Agent, or Firm*—Cindy Kaplan

(57) ABSTRACT

A system and method for measuring convergence performance in a network are disclosed. In one embodiment, the method includes receiving a plurality of probes at a network device, temporarily storing data from at least a portion of the received probes and deleting at least a portion of the temporarily stored data at regular intervals, and receiving a packet indicating a convergence event and storing data from probes received over a predetermined period.

20 Claims, 6 Drawing Sheets

US 7,898,973 B2

CONVERGENCE MEASUREMENT IN COMPUTER NETWORK

BACKGROUND OF THE INVENTION

The present disclosure relates generally to convergence measurement in a computer network, and more specifically, a distributed system for IGP convergence measurement.

OSPF (Open Shortest Path First) and IS-IS (Intermediate System to Intermediate System) are link state Interior Gateway Protocols (IGPs) used in today's IP (Internet Protocol) networks. Following the widespread deployment of real time applications such as VoIP (Voice over IP) and VPNs (Virtual Private Networks), much tighter Service Level Agreements (SLAs) are required, leading to faster IGP convergence requirements. The faster IGP convergence requirements have resulted in a need for systems to monitor and assess IGP convergence performance.

Difficulties in monitoring IGP convergence are due to the size of a network (e.g., large network may include around 950 nodes and 500 edge routers), the smallness of the measured parameter (convergence typically occurs in a few hundreds of milliseconds), the non-predictability of convergence events (topological failures may occur at any time and location), and the level of details required to correctly assess convergence performance.

DESCRIPTION OF EXAMPLE EMBODIMENTS

Overview

A method and apparatus for measuring convergence performance in a network are disclosed. In one embodiment, the method generally comprises receiving a plurality of probes at a network device, temporarily storing data from at least a portion of the received probes and deleting at least a portion of the temporarily stored data at regular intervals, and receiving a packet indicating a convergence event and storing data from probes received over a predetermined period.

In one embodiment, an apparatus for measuring convergence performance in a network generally comprises a receiver operable to receive a plurality of probes and record entries in a first log or a second log. The first log is configured to temporarily store the entries and to replace old entries in the log with new entries to accommodate limited space in the first log. The second log is configured to store all of the entries. The system further includes a monitor configured to monitor received packets and identify a packet indicating a convergence event. The receiver is configured to record entries in the first log, and upon the monitor identifying a packet indicating a convergence event, record entries in the second log for a predetermined period.

Example Embodiments

The following description is presented to enable one of ordinary skill in the art to make and use the invention. Descriptions of specific embodiments and applications are provided only as examples and various modifications will be readily apparent to those skilled in the art. The general principles described herein may be applied to other embodiments and applications without departing from the scope of the invention. Thus, the present invention is not to be limited to the embodiments shown, but is to be accorded the widest scope consistent with the principles and features described herein. For purpose of clarity, details relating to technical material that is known in the technical fields related to the invention have not been described in detail.

A method and system described herein provide convergence measurements which may be used to assess convergence performance. In one embodiment, the system operates as a distributed IPSLA (Internet Protocol Service Level Agreement) mechanism for IGP (Internet Gateway Protocol) convergence measurement. Convergence measurements may include, for example, loss distance and period, latency and jitter, TTL (time to live) variation, and packet reordering. As described in detail below, a representative but scalable number of probing instances are selected to record a number of detailed parameters with limited memory requirements and limited probe generation and reception rates. Each probing instance is associated with a path between two nodes in a network (e.g., start edge router and end edge router).

Figure 1:
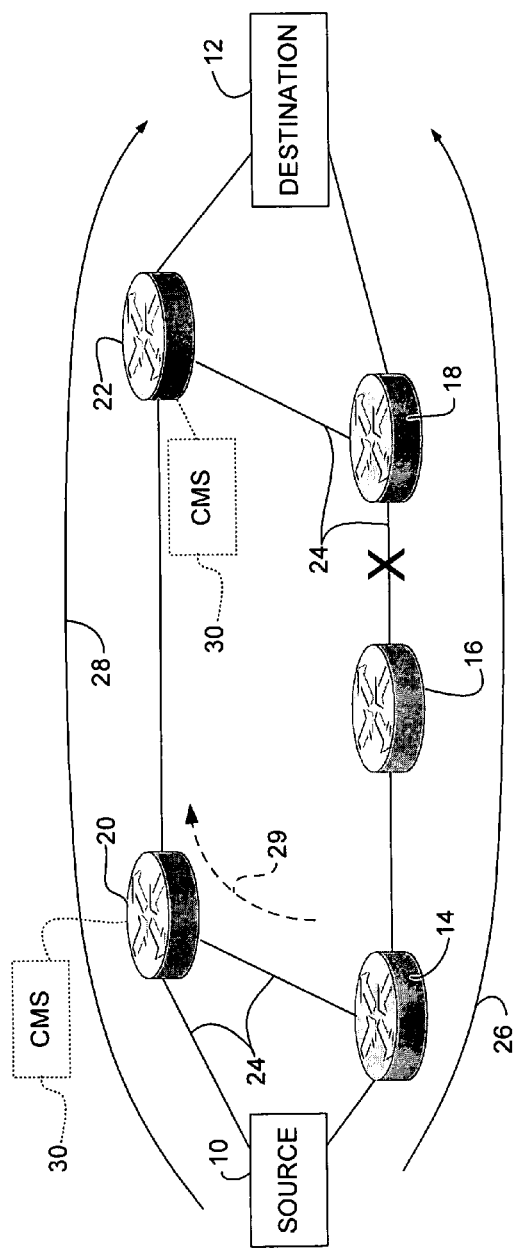
FIG. 1 illustrates an example of a network in which embodiments described herein may be implemented.

Referring now to the drawings, and first to FIG. 1, an example of a network that may implement embodiments described herein is shown. For simplification, only a small number of nodes are shown. The system operates in the context of a data communication network including multiple network elements. Some of the elements in a network that employs the system may be network devices such as routers or switches. The network device may include, for example, a master central processing unit (CPU), interfaces, and a bus. The CPU preferably includes memory and a processor. The network device may be implemented on a general purpose network machine such as described below with respect to FIG. 7.

The network shown in the example of FIG. 1 includes a source 10, destination 12, and a plurality of routers 14, 16, 18, 20, 22 connected by links 24. A convergence measurement system (CMS) 30 is located at one or more nodes. Prior to a network failure, packets (referred to as "A" packets) follow path 26 and other packets (referred to as "B" packets) follow path 28. At time T1, a link failure occurs in the link between node 16 and node 18. The A packets are on the path with the failure and are rerouted at node 14 from node 16 to node 20, as shown by dashed line 29. At time T2 the network converges, a next best path is computed, and traffic (A packets) again reaches the destination 12. The B packets are already on the path to which the A packets are rerouted following the failure. The rerouting of the A packets may cause congestion (transient or stable), which would impact the B packets. The convergence measurement system 30 provides assessment of the convergence performance for the A packets in terms of loss distance and period (see, RFC 3357, "One-way Loss Pattern Sample Metrics", R. Koodli et al., August 2002), latency and jitter, TTL (time to live) variation, and packet reordering, for example. The convergence measurement system preferably also measures loss distance and period and latency/jitter impacts on the B packets. In one embodiment, A and B packets are treated equally by the convergence measurement system and an offline tool, which retrieves measurements from the system, is configured for determining which measurements are linked to A flows and which measurements are linked to B flows.

The following example describes IS-IS convergence, but it is to be understood that the embodiments may also be used to assess OSPF convergence. Each of the routers 14, 16, 18, 20, 22, exchange data with its neighbors to determine its local topology. The router then describes its local topology inside a link-state packet (LSP) that is flooded throughout the network. New LSPs are generated and flooded each time the information contained in the LSP (neighbors, IP addresses, metrics, traffic engineering information, etc.) changes. Upon expiration of a LSPs lifetime, the LSP is flooded again by its parent router. Once an LSP describing a topology change has reached a router, the router updates its link state database, which triggers a request to update the routing information base (RIB). In order to update its RIB, the router computes its SPT (shortest path tree). The RIB update triggers the update of the forwarding information base (FIB). When a link fails, the two routers attached to it detect the failure and originate a new LSP.

In the above example, IGP convergence time includes link failure detection time, time to originate a LSP describing the new topology after the link failure, flooding time from the node detecting the failure to the rerouting nodes that perform a FIB update to bring the network in a consistent forwarding state, SPT computation time, time to update the RIB and FIB on the main CPU, and time to distribute the FIB updates to link cards in the case of a distributed router architecture. As described below, the convergence measurement system uses LSPs to identify a convergence event and unidirectional probing instances to collect a number of parameters which are used to measure convergence time and assess convergence performance.

In one embodiment, probing instances (I) are selected based on a traffic matrix for the network and a coverage objective C. For example, if the network includes 1000 routers R[1] to R[1000], a traffic matrix T and a coverage objective C, the chosen instances may be: R[1]→R[24], R[1]→R[560], R[1]→[976], . . . , R[1000]→R[6]. In one embodiment, probing instances are selected with a coverage objective of approximately 80% of the network traffic. The selection of one instance from node C to node D does not necessarily imply that the instance from node D to node C is also selected. However, such a mode could be chosen if this simplifies implementation.

Figure 2:
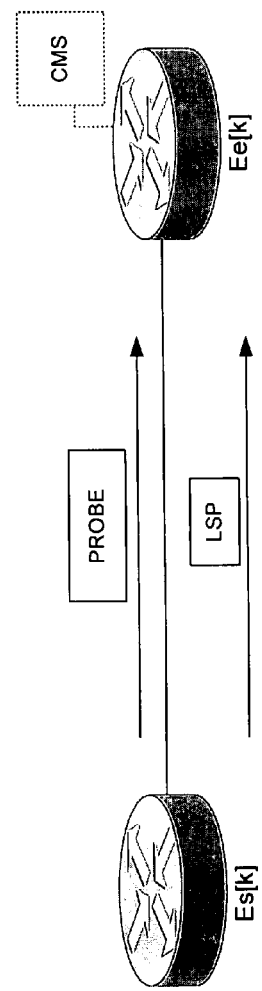
FIG. 2 illustrates transfer of probes and link-state packets used in an embodiment of a convergence measurement system.

FIG. 2 illustrates an example of an instance I[k], which is made up of a start edge router Es[k] and an end edge router Ee[k]. The system may be configured, for example, so that Es[k] continuously sends probes to Ee[k] at a rate of 20 pps (probes per second), which results in a granularity of 50 ms. The instances may be configured to send probes at various rates. Since convergence typically occurs in a few hundreds of milliseconds, the granularity is preferably at least 50 milliseconds. The start edge router Es[k] also transmits link-state packets (LSPs) to the end edge router Ee[k], as previously described.

In one example, the edge router may be involved in about 100 of such instances. This would require a worst case of 2 kpps of constant generation/reception and the overall load for the network would be in the order of 10 kpps or less. The probes thus result in a negligible load for current backbone capacities.

The probes are preferably configured to support a timestamp such that the system or offline tool can derive path latency and jitter. The probes are also preferably configured to support a TTL such that the system can assess occurrence and amplitude of path changes. The probes are also preferably configured to support a sequence number such that the system can assess packet reordering within the flow. It is to be understood that the parameters listed above are only examples and that the probes may be configured to monitor other parameters or any combination of parameters.

Figure 3:
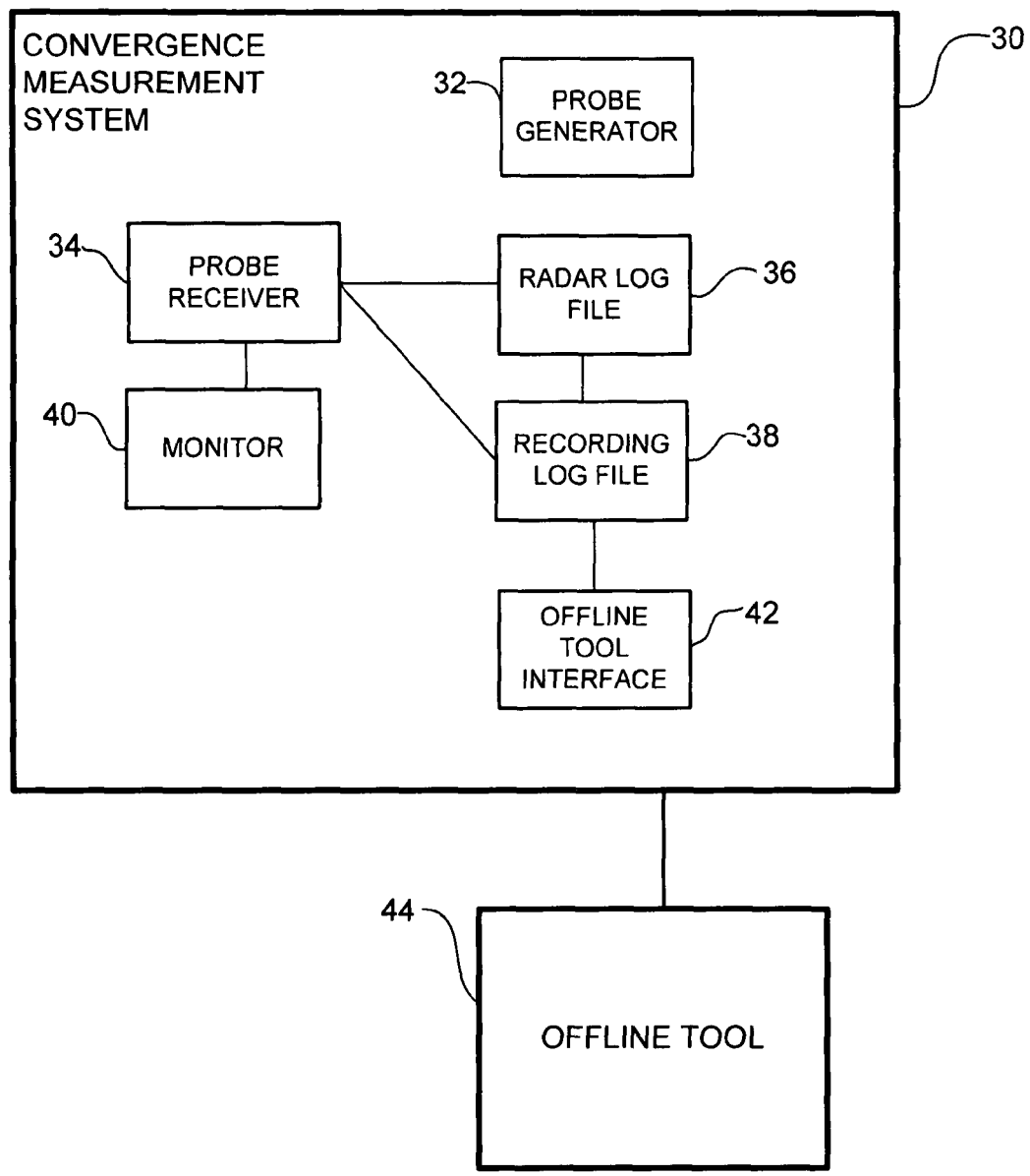
FIG. 3 is a block diagram illustrating components of one embodiment of the convergence measurement system.

FIG. 3 is a block diagram schematically illustrating components of the measurement system 30 according to one embodiment. It is to be understood that some of the blocks shown in FIG. 3 may represent operations performed in software, hardware, or a combination thereof. The system 30 includes a probe generator 32, probe receiver 34, and one or more log files (e.g., radar log file (first log) 36, recording log file (second log) 38). The probe generator 32 is operable to generate probes at a specified interval and insert a timestamp and sequence number to the probe, for example. The probe receiver 34 receives probes and records data in one or more of the log files 36, 38. A monitor 40 monitors received LSPs and identifies a packet indicating a convergence event (described below). The system 30 may further include an offline tool interface 42 configured to communicate with an offline tool 44, which may be used to collect data stored in the recording log file 38. The system may be configured to store any number of recording logs 38 until the files are retrieved by the offline tool or user. Also, the logs 36, 38 may be stored in one database or any number or types of databases or files.

It is to be understood that the system 30 shown in FIG. 3 is only one example and that the convergence measurement system may include different components or arrangement, without departing from the scope of the invention.

Figure 4:
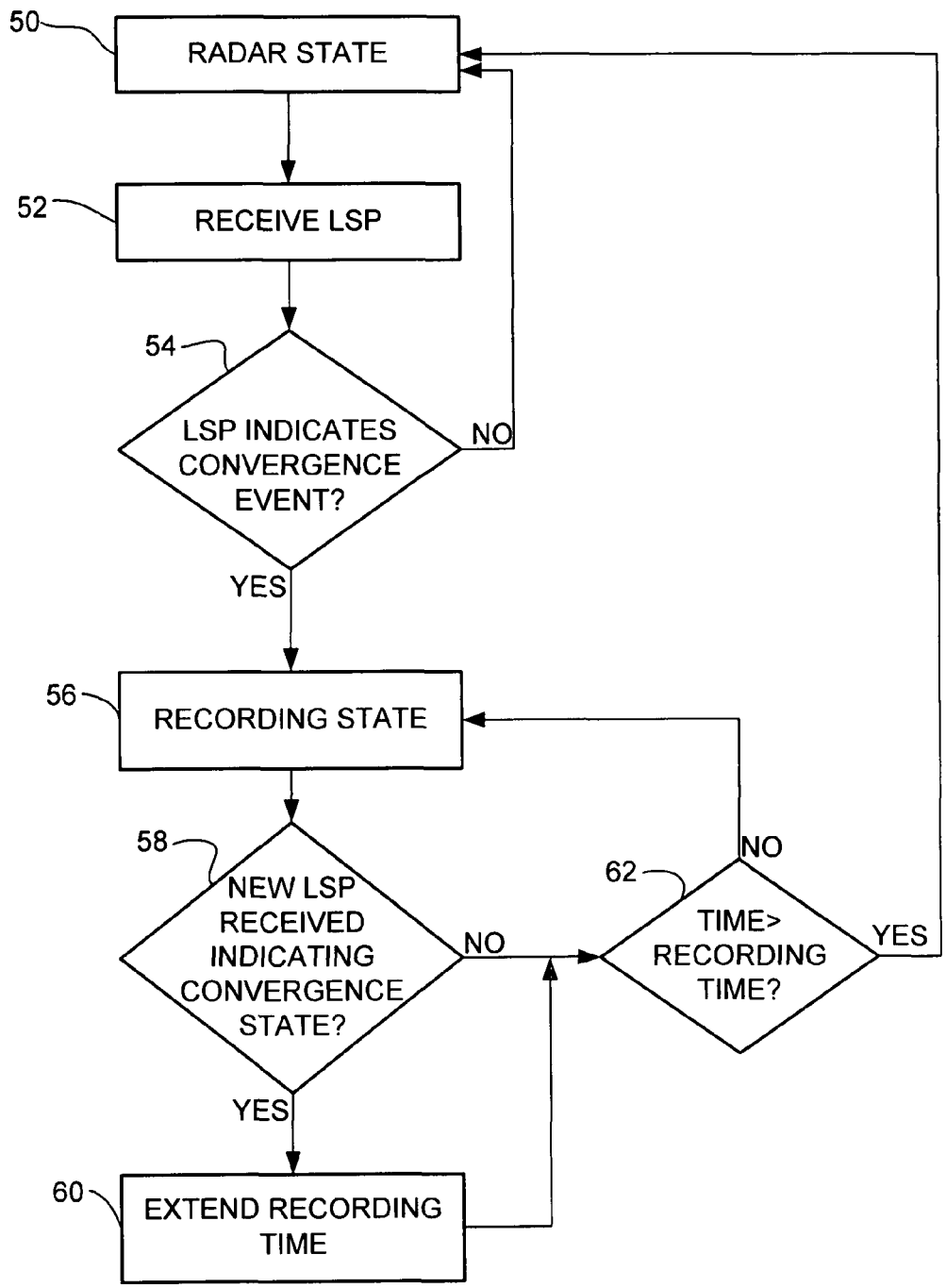
FIG. 4 is a flowchart illustrating change in state of the convergence measurement system, according to one embodiment.
Figure 5:
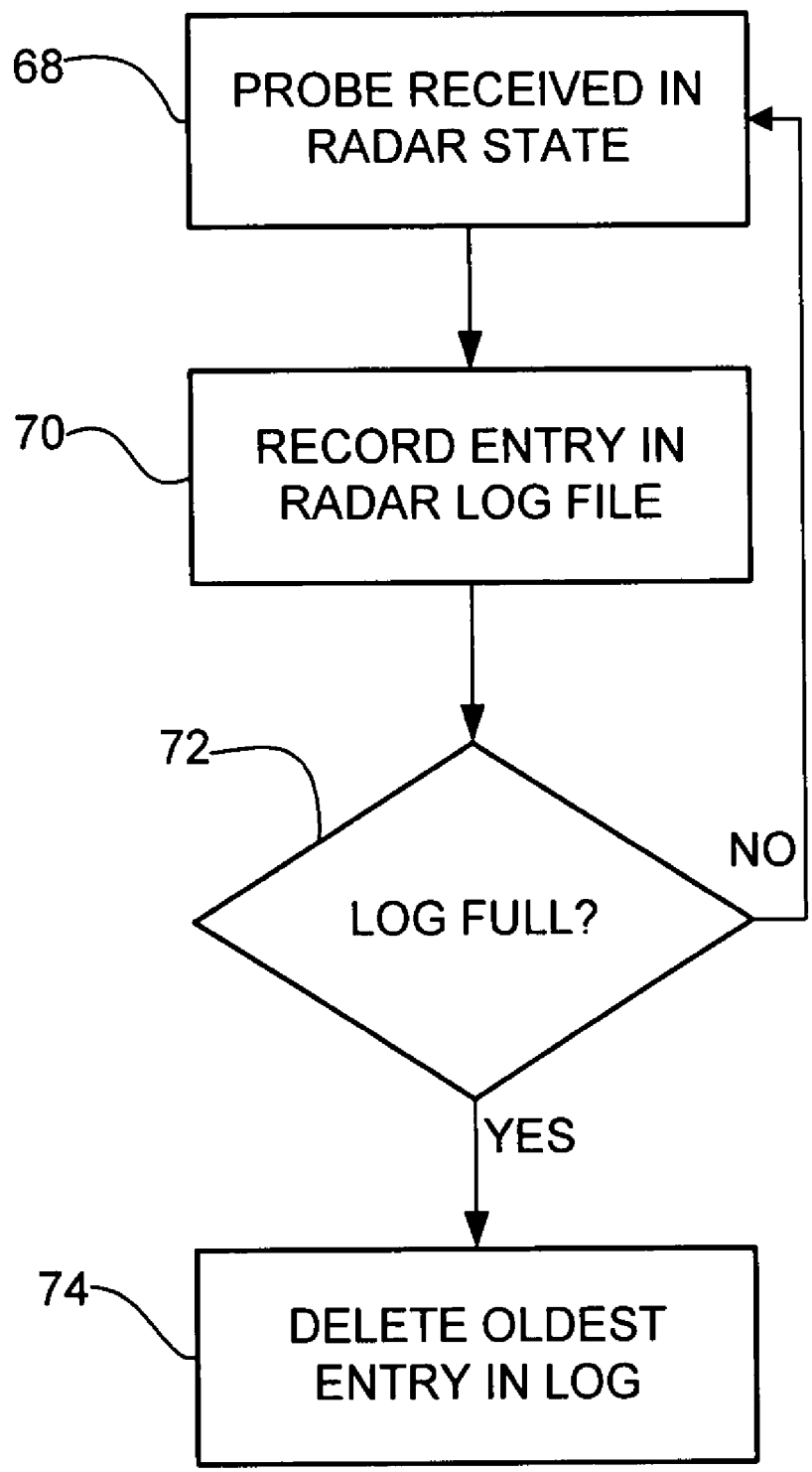
FIG. 5 is a flowchart illustrating operation of the convergence measurement system during a radar state, according to one embodiment.
Figure 6:
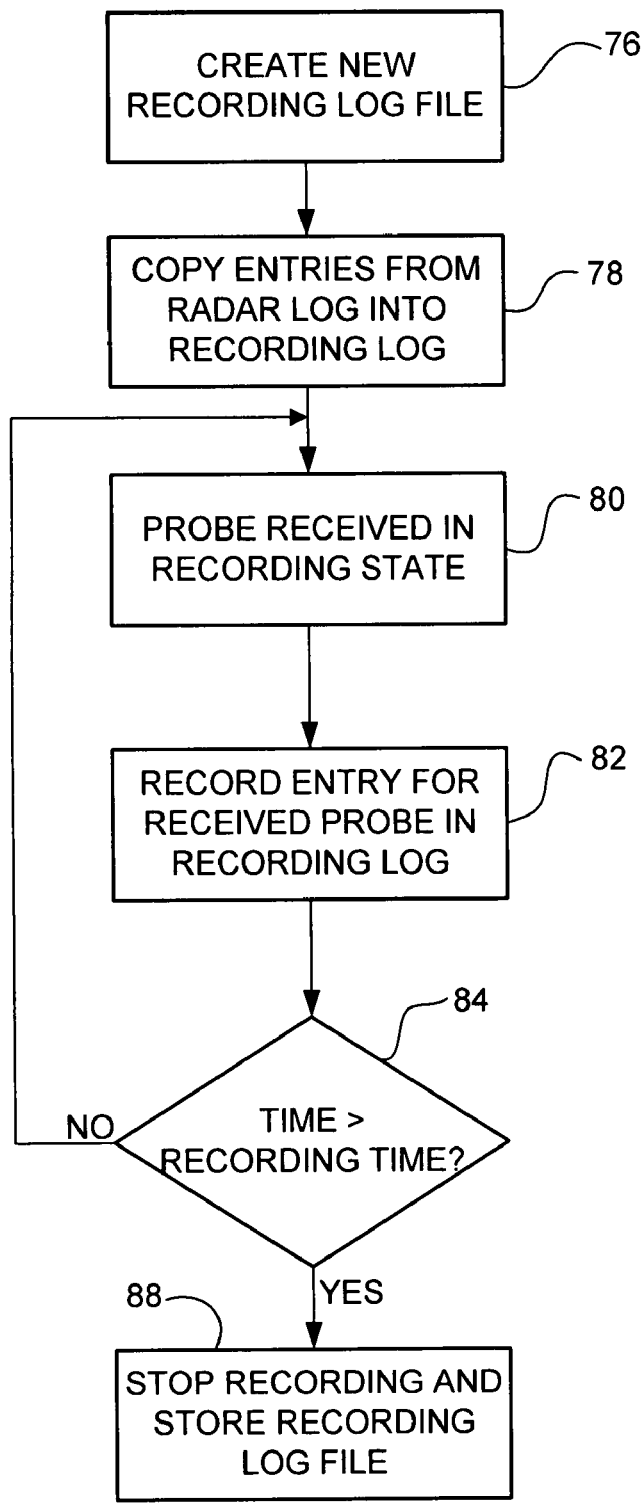
FIG. 6 is a flowchart illustrating operation of the convergence measurement system during a recording state, according to one embodiment.

FIGS. 4, 5, and 6 are flowcharts illustrating an example of a process for convergence measurement. FIG. 4 illustrates an overview of the process and two operating states (RADAR, RECORDING) for the convergence measurement system. FIGS. 5 and 6 illustrate details of system operation in the RADAR state and the RECORDING state, respectively.

As shown in FIG. 4, the system initially operates in RADAR state (step 50). A node (e.g., edge node Ee[k] of FIG. 2) continuously receives probes corresponding to instances, as previously described. The node (along with any other nodes included in a selected instance) is part of IS-IS (or OSPF). The node thus listens to the normal LSP flooding and has an accurate view of the topology and a full visibility of routing changes. The node examines any received LSP to determine if it is indicative of a convergence event (steps 52 and 54).

There are various ways to determine whether a received LSP is indicative of convergence event. First, the system may be configured to filter out any LSP that is clearly not impacting a routing decision (e.g., TE bandwidth change, tag change, LSP refresh). Second, from the remaining LSPs, different levels may be selected from a list of types of LSPs indicating a topology change. The following list is an example from coarsest changes to the finest changes:

only an LSP that advertises adjacency or leaf change;

only an LSP that advertises adjacency change;

only an LSP that advertises an adjacency change which impacts one of the best paths from any source address of any selected instance with E;

only an LSP that advertises an adjacency change on the best path for an instance to E and only that instance will go in recording state.

The decision as to which selection algorithm to use may be made on a network by network basis depending on the network scale and LSP change volume and frequency.

If the received LSP does not indicate a convergence event, the system remains in RADAR state. If the received LSP does indicate a convergence event, the state changes to RECORDING (step 56). The node turns all of its locally terminated instances to the RECORDING state for a predetermined period (e.g., the next 60 seconds). The time interval may be a customizable value.

If the node is in RECORDING state and receives a new LSP indicating a convergence event, the node extends the RECORDING state for another interval (e.g., 60 seconds) (steps 58 and 60). The system is preferably configured with a maximum recording length to prevent continuous recording and safeguard the system. Once the recording time (or extended recorded time) has been reached the system returns to RADAR state (step 62).

Referring now to FIG. 5, details of system operation in RADAR state are shown. At step 68 a new probe is received. For each received probe, the node archives an entry in a log file (referred to herein as a RADAR log file) (step 70). In one embodiment, the RADAR log file is a circular buffer that includes the following entry for instance I: [timestamp, sequence, received timestamp, sent timestamp, received TTL]. This data is temporarily stored in the RADAR log file and at least a portion of the data is deleted at regular intervals (steps 72 and 74). The regular interval may be when the log file reaches a specified capacity or at a specified time interval. In the embodiment described above in which a node sends 20 probes per second, 20 entries are logged per second. In one embodiment, the RADAR log is implemented as a stack of 200 entries. Each time that a new entry is pushed on the stack, the last entry (i.e., oldest entry) is deleted so that at any time the log includes the last 200 such entries. The node therefore contains a complete and accurate view of the instance I for the last 10 seconds.

FIG. 6 illustrates operation of the convergence measurement system in the RECORDING state. At step 76 a new log file (referred to herein as RECORDING log file) is created. Entries from the RADAR log file are copied into the RECORDING log file (step 78). While the system is in RECORDING state, any new log entry is appended to the RECORDING log file (steps 80 and 82). Once the recording time has been reached, the new recording log file is saved and the system returns to RADAR state (steps 84 and 88). In the above example, the RECORDING state time interval is 60 seconds, the RADAR log file is configured to hold 200 entries, and the probes are received at a rate of 20 probes per second. In this example, the node captures and archives a 70-second view of the routing convergence event; from 10 seconds prior to the convergence event until 60 seconds after.

It is to be understood that the embodiments described above are only examples and that the system may be configured with any suitable probe per second rate, maximum stack depth for radar log file, or recording time, without departing from the scope of the invention.

As discussed above, the offline tool 44 may be used to retrieve the stored data and process it to quantify the convergence performance. The offline tool is preferably also part of the IS-IS (or OSPF) domain so that it can reconstruct the topology at any time in the past and fully determine what instances were "A" packets (rerouted) or "B" packets (already on path that A packets were rerouted onto) for any failure. Once this is done, the tool can then use the 70 seconds (or other time interval) of recording for each instance to assess where packets were dropped, how long (typical convergence duration) and how (it could be that the packets are dropped in two or three steps if the convergence goes through several intermediate states before stabilizing onto the final path). The TTL and latency variation may be analyzed to even further quantify the convergence quality and its impact on key SLA parameters within the network.

Figure 7:
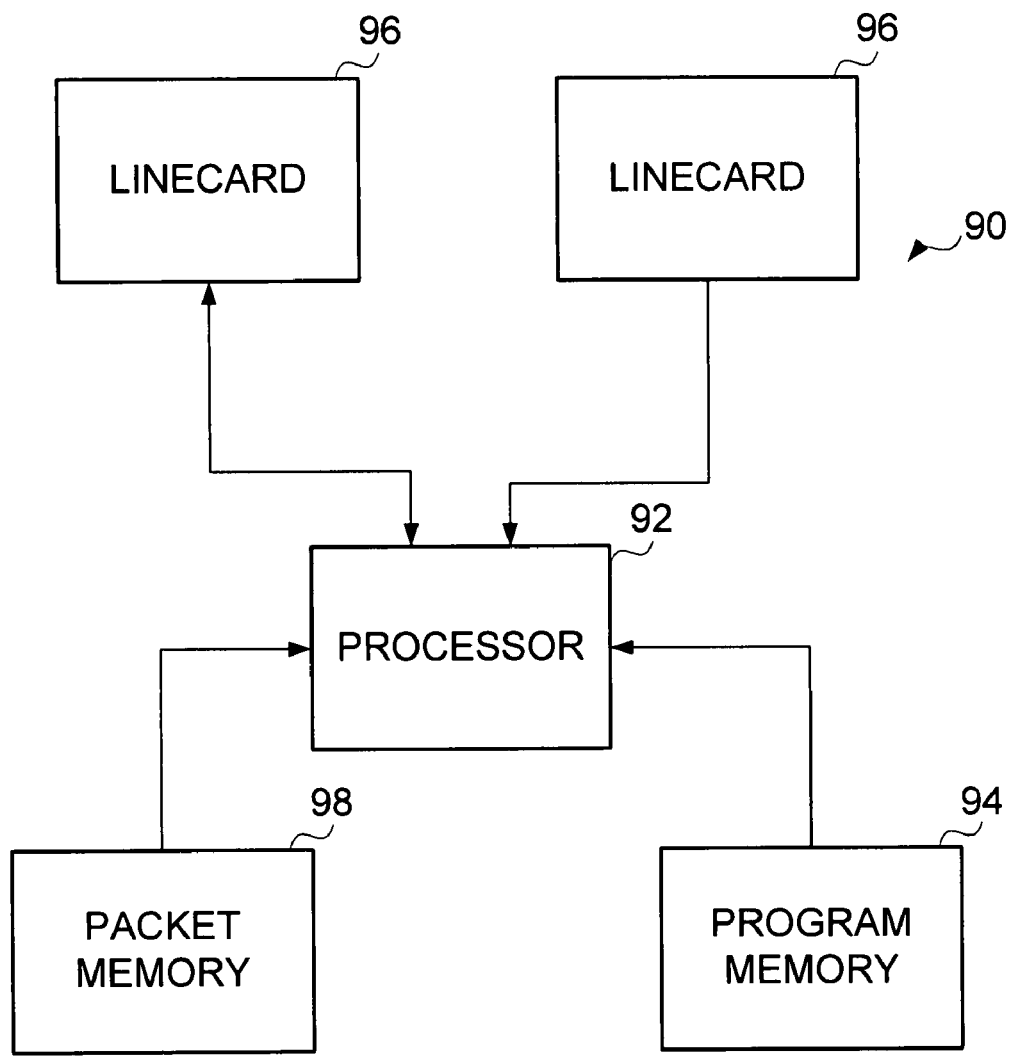
FIG. 7 depicts an example of a network device useful in implementing the embodiments described herein.

FIG. 7 depicts a network device 90 that may be used to implement the convergence measurement system described herein. In one embodiment, network device 90 is a programmable machine that may be implemented in hardware, software, or any combination thereof. A processor 92 executes codes stored in a program memory 94. Program memory 94 is one example of a computer-readable medium. Program memory 94 can be a volatile memory. Another form of computer-readable medium storing the same codes would be some type of non-volatile storage such as floppy disks, CD-ROMs, DVD-ROMs, hard disks, flash memory, etc.

Network device 90 interfaces with physical media via a plurality of linecards 96. Any number of linecards 96 may be used and each linecard may include numerous separate physical interfaces. Linecards 96 may incorporate DSL interfaces, Ethernet interfaces, Gigabit Ethernet interfaces, 10-Gigabit Ethernet interfaces, Frame relay interfaces, ATM interfaces, SONET interfaces, dial-up interfaces, wireless interfaces, etc. The various components are interconnected by a backplane. As packets are received, processed, and forwarded by network device 90, they may be stored in a packet memory 98.

As can be observed from the foregoing, the system and method described herein have many advantages. For example, the system and method are completely automatic and can be configured to measure multiple parameters including, for example, latency, jitter, TTL, and sequence and drop distance/period for rerouted packets and nonrerouted packets. The system is also scalable in terms of memory requirements and pps generation/reception requirement and overall active probe load on the network. Furthermore, measurements can be made with a customizable granularity.

Although the present invention has been described in accordance with the embodiments shown, one of ordinary skill in the art will readily recognize that there could be variations made to the embodiments without departing from the scope of the present invention. Accordingly, it is intended that all matter contained in the above description and shown in the accompanying drawings shall be interpreted as illustrative and not in a limiting sense.

What is claimed is:

1. A method for measuring convergence performance in a network, comprising:
   receiving a plurality of probes at a network device;
   temporarily storing data from at least a portion of said received probes and deleting at least a portion of said temporarily stored data at regular intervals; and
   receiving a packet indicating a convergence event and storing data from said probes received over a predetermined period.

2. The method of claim 1 wherein temporarily storing data from at least a portion of said received probes comprises recording an entry in a first log upon receiving one of said probes.

3. The method of claim 2 wherein deleting at least a portion of said temporarily stored data at regular intervals comprises deleting one of said entries from the first log upon recording a new entry.

4. The method of claim 2 further comprising copying said entries in the first log into a second log upon receiving a packet indicating a convergence event.

5. The method of claim 4 wherein storing data from said probes received over a predetermined period comprises recording an entry in the second log upon receiving one of said probes.

6. The method of claim 1 wherein said predetermined period comprises at least 60 seconds.

7. The method of claim 1 wherein receiving a packet indicating a convergence event comprises receiving a link-state packet.

8. The method of claim 7 wherein the link-state packet advertises an adjacency change or a leaf change.

9. An apparatus for measuring convergence performance in a network, comprising:
- a receiver operable to receive a plurality of probes and record entries in a first log or a second log;
- the first log configured to temporarily store said entries and to replace old entries in said log with new entries to accommodate limited space in the first log;
- the second log configured to store all of said entries; and
- a monitor configured to monitor received packets and identify a packet indicating a convergence event;
- wherein the receiver is configured to record first entries in the first log, and upon the monitor identifying a packet indicating a convergence event, record second entries in the second log for a predetermined period.

10. The apparatus of claim 9 wherein said entries recorded in the first or second logs comprise a sequence number.

11. The apparatus of claim 9 wherein said entries recorded in the first or second logs comprise a timestamp indicating the time said probe was sent and a timestamp indicating the time said probe was received.

12. The apparatus of claim 9 wherein the system is configured to transfer said second entries from the second log to a tool configured to analyze convergence performance.

13. The apparatus of claim 9 wherein a packet indicating a convergence event comprises a link-state packet.

14. The apparatus of claim 13 wherein the link-state packet advertises an adjacency change or leaf change.

15. The apparatus of claim 9 wherein the predetermined period comprises at least 60 seconds.

16. The apparatus of claim 9 wherein the second log is configured to receive data stored in the first log upon the monitor identifying a packet indicating a convergence event.

17. An apparatus for measuring convergence performance in a network, comprising:
- means for receiving a plurality of probes at a network device;
- means for temporarily storing data from at least a portion of said received probes and deleting at least a portion of said temporarily stored data at regular intervals; and
- means for receiving a packet indicating a convergence event and storing data from said probes received over a predetermined period.

18. The apparatus of claim 17 further comprising a first log for temporarily storing said data and a second log for storing said data upon receiving a packet indicating a convergence event.

19. The apparatus of claim 18 further comprising means for copying said entries from the first log into the second log upon receiving a packet indicating a convergence event.

20. The apparatus of claim 17 wherein a packet indicating a convergence event comprises a packet advertising an adjacency change or a leaf change.

\* \* \* \* \*